(12) United States Patent
Kim

(10) Patent No.: US 7,567,827 B2
(45) Date of Patent: Jul. 28, 2009

(54) MOBILE TERMINAL AND METHOD FOR CHANGING AN OPERATIONAL MODE USING SPEECH RECOGNITION

(75) Inventor: Young-Duk Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 11/516,588

(22) Filed: Sep. 7, 2006

(65) Prior Publication Data

US 2007/0281761 A1 Dec. 6, 2007

(30) Foreign Application Priority Data

Jun. 1, 2006 (KR) .................. 10-2006-0049386

(51) Int. Cl.
H04B 1/38 (2006.01)
(52) U.S. Cl. ............... 455/574; 370/311; 370/318; 370/332
(58) Field of Classification Search ............. 455/415, 455/418, 563, 574
See application file for complete search history.

(56) References Cited

U.S. PATENT DOCUMENTS

| 5,920,835 | A * | 7/1999 | Huzenlaub et al. | 704/235 |
|---|---|---|---|---|
| 6,449,496 | B1 * | 9/2002 | Beith et al. | 455/563 |
| 6,901,270 | B1 * | 5/2005 | Beach | 455/563 |
| 7,000,140 | B2 * | 2/2006 | Okubo et al. | 713/601 |
| 2005/0190932 | A1 * | 9/2005 | Woo et al. | 381/119 |

FOREIGN PATENT DOCUMENTS

| KR | 1020040089889 | 10/2004 |
|---|---|---|
| KR | 1020060096684 | 9/2006 |

OTHER PUBLICATIONS

Ken Hinckley and EricHorvitz, Toward More Sensitive Mobile Phones, Nov. 11-14, 2001, UIST 01, pp. 191-192.*
Palm, Using your 700p Treo Smartphone, pp. 1-50.*

* cited by examiner

Primary Examiner—Vincent P Harper
Assistant Examiner—Natasha Cosme
(74) Attorney, Agent, or Firm—Roylance, Abrams, Berdo & Goodman, L.L.P.

(57) ABSTRACT

Disclosed is a mobile terminal, which includes a microphone path switching unit for switching a microphone signal path used to input audio information from a microphone; an interrupt generator for storing audio information and for generating an interrupt signal if the audio information from the microphone path switching unit and the stored audio information substantially correspond with each other; and a controller for controlling the microphone path switching unit to route the audio information from the microphone to the interrupt generator if the mobile terminal enters a power saving mode and for releasing the power saving mode if the interrupt signal is generated while in the power saving mode. Accordingly, since a mobile terminal releases a power saving mode and enters a speech recognition mode, if a specific speech or a sound is input while in the power saving mode, a user can telephone or send a short message despite the terminal being in the power saving mode.

19 Claims, 4 Drawing Sheets

MOBILE TERMINAL AND METHOD FOR CHANGING AN OPERATIONAL MODE USING SPEECH RECOGNITION

CROSS-REFERENCE TO RELATED APPLICATION

This application claims the benefit under 35 U.S.C. §119(a) to an application entitled "Mobile Terminal And Method For Changing Operation Mode Using Speech Recognition" filed at the Korean Intellectual Property Office on Jun. 1, 2006 and assigned Serial No. 2006-49386, the entire disclosure of which is incorporated by reference.

BACKGROUND OF THE INVENTION

1. Field of the Invention

The present invention relates to a mobile terminal. More particularly, the present invention relates to a mobile terminal and a method for changing an operational mode using speech recognition.

2. Description of the Related Art

Mobile terminals are now being provided with speech recognition capabilities in addition to the capability of making and receiving telephone calls. The speech recognition capability is being used with various and convenient user-centric functions. For example, a user may input speech corresponding to a telephone number without directly selecting keys corresponding to the telephone number to input the telephone number when dialing. In other words, the user can perform speech dialing to input the telephone number.

Generally, when the terminal enters a power saving mode or a sleep mode, a baseband chip (e.g., a controller (MSM), an audio processor, a modem, a memory and the like) of an existing mobile terminal provided with speech recognition capabilities is deactivated. As a result, the terminal when in a power saving mode or a sleep mode cannot perform speech recognition. To activate speech recognition for the terminal in a power saving mode or a sleep mode, the user has to generate a predetermined event (e.g., inputting a key, opening a folder, or the like) to release the power saving mode of a mobile terminal, and then input a specific key that is used for entering into a speech recognition mode. Therefore, there is an inconvenience to the user when the user intends to use speech recognition with a terminal in a power saving mode or a sleep mode.

Accordingly, there is a need for an improved mobile terminal and a method, which can release a power saving mode using speech recognition.

SUMMARY OF THE INVENTION

Exemplary embodiments of the present invention address at least the above problems and/or disadvantages and provide at least the advantages described below. Accordingly, an aspect of the present invention is to provide a mobile terminal and a method, which can release a power saving mode using a speech recognition.

It is another aspect of an exemplary embodiment of the present invention to provide a mobile terminal and a method, which can immediately convert a power saving mode into a speech recognition mode using a speech recognition.

It is a further aspect of an exemplary embodiment of the present invention to provide a method in which a user can easily search for the location of a terminal using a speech recognition although the user does not know the location of the terminal which has entered into a power saving mode.

According to an another aspect of an exemplary embodiment of the present invention, there is provided a mobile terminal, which includes a microphone path switching unit for switching a microphone signal path used to input audio information from a microphone; an interrupt generator for storing audio information and for generating an interrupt signal if the audio information from the microphone path switching unit and the stored audio information substantially correspond with each other; and a controller for controlling the microphone path switching unit to route the audio information from the microphone to the interrupt generator if the mobile terminal enters a power saving mode and for releasing the power saving mode if the interrupt signal is generated while in the power saving mode.

According to still another aspect of an exemplary embodiment of the present invention, there is provided a method of controlling an operational mode conversion using speech recognition in a mobile terminal, which includes the steps of storing audio information; comparing audio information of an input audio information signal with the stored audio information if the operational mode of the mobile terminal is a power saving mode; and releasing the power saving mode if the audio information of the input audio information signal and the stored audio information substantially correspond with each other.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
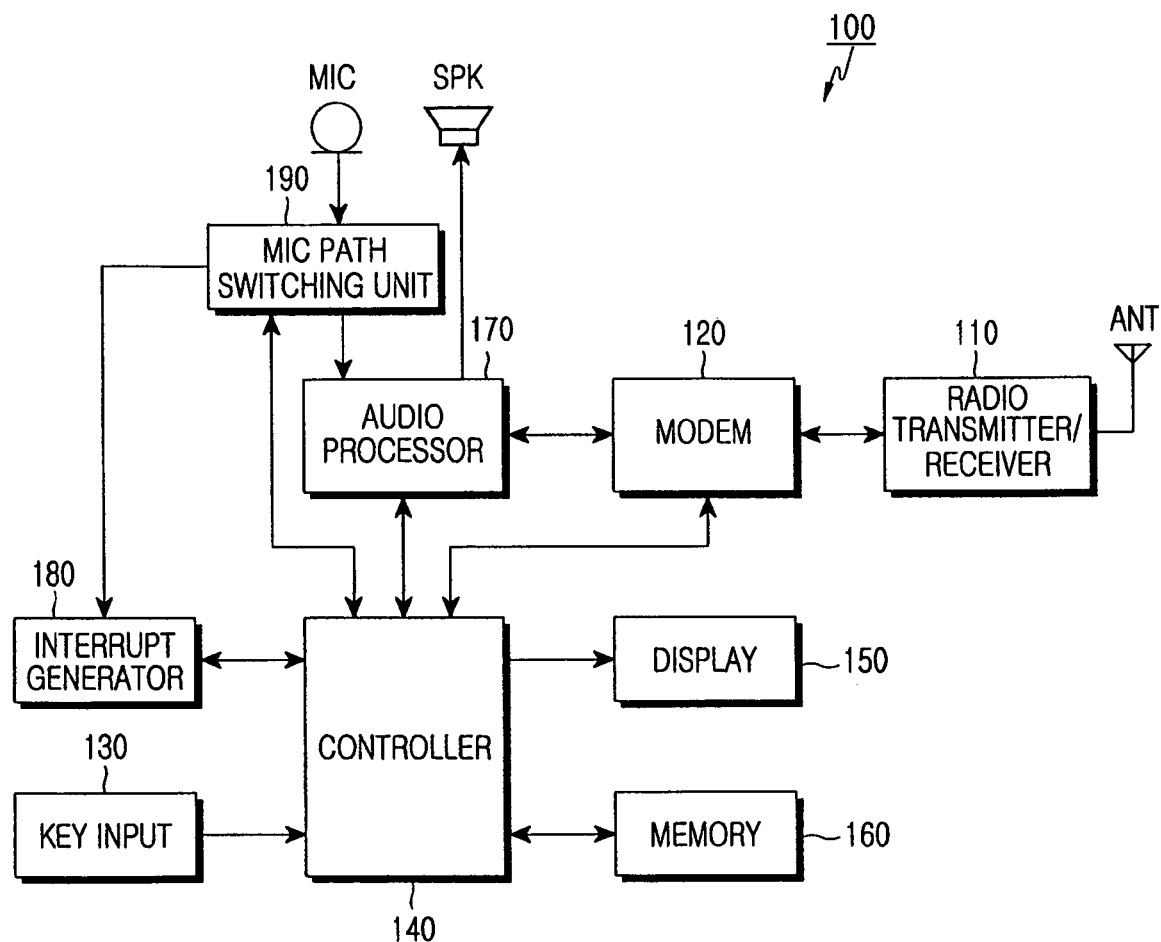
FIG. 1 is a block diagram showing a configuration of a mobile terminal according to an exemplary embodiment of the present invention.

FIG. 1 is a block diagram showing a configuration of a mobile terminal according to an exemplary embodiment of the present invention.

Figure 2:
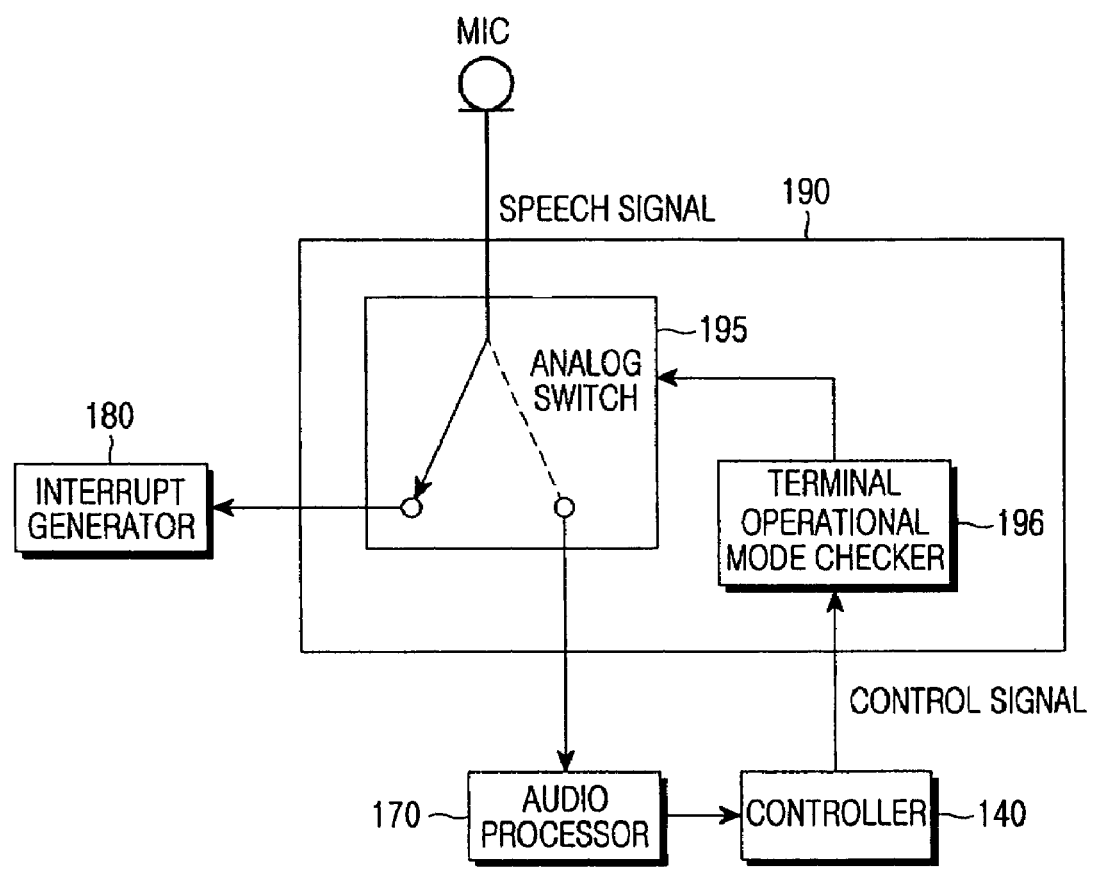
FIG. 2 is a block diagram illustrating a microphone path switching unit of FIG. 1.
Figure 3:
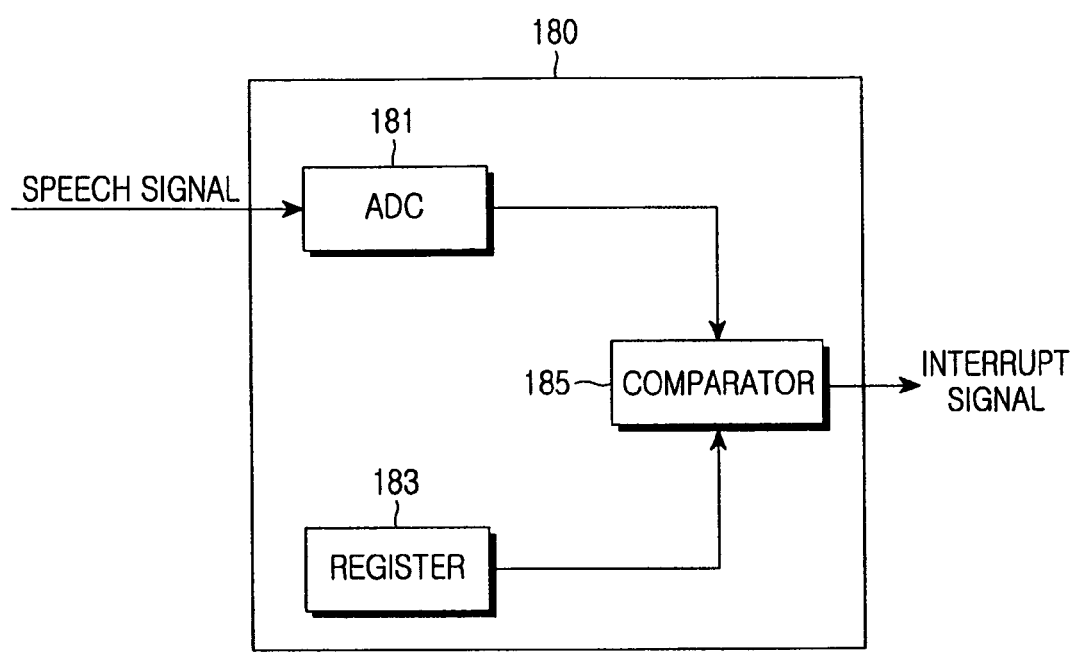
FIG. 3 is a block diagram illustrating an interrupt generator of FIG. 1.

The mobile terminal 100 shown in FIG. 1 includes a radio transmitter/receiver 110, a modem 120, a key input 130, a controller 140, a display 150, a memory 160, an audio processor 170, an interrupt generator 180 and a microphone path switching unit 190. FIG. 2 is a block diagram illustrating the microphone path switching unit 190 of FIG. 1, and FIG. 3 is a block diagram illustrating the interrupt generator 180 of FIG. 1. As shown in FIG. 2, the microphone path switching unit 190 includes an analog switch 195 and a terminal operation mode checker 196. The microphone path switching unit 190 may be included in the audio processor 170. As shown in FIG. 2, the interrupt generator 180 includes an Analog/Digital Converter (ADC) 181, a register 183 and a comparator 185.

Referring to FIGS. 1 to 3, the radio transmitter/receiver 110 transmits/receives speech data, character data, video data and/or control data under the control of the controller 140. To this end, the radio transmitter/receiver 110 includes an RF transmitter (not shown) for up-converting and amplifying the frequency of a transmitted signal, an RF receiver (not shown) for low-noise amplifying a received signal and down-converting the frequency thereof, and the like.

The modem 120 is provided with a transmitter (not shown) for encoding and modulating the transmitted signal, a receiver (not shown) for demodulating and decoding the received signal, and the like.

The key input 130 has a key matrix structure (not shown) and is provided with character keys, numerical keys, various functional keys and external volume keys so as to output a key input signal to the controller 140 corresponding to a key input by a user.

The controller 140 controls a general operation of the mobile terminal 100 according to the exemplary embodiment of the present invention. Further, the controller 140 receives speech information input through a microphone for determining if it should convert an operation mode of the mobile terminal 100 so as to store the speech information in the interrupt generator 180. In this exemplary embodiment of the present invention, the conversion of an operation mode is the release of a power saving mode using speech recognition. Further, although the speech information is preferably a user's speech, it may be any specific sound. The controller 140 converts the user's speech or specific sound into digital information to store it in the interrupt generator 180.

In a case where the controller 140 converts the operation mode of the mobile terminal 100 into the power saving mode, the controller 140 simultaneously outputs a control signal to the microphone path switching unit 190 and converts the operation mode of the mobile terminal 100 into the power saving mode. At this time, the control signal is a signal for controlling the microphone path switching unit 190 so as to output a speech signal input through the microphone to the interrupt generator 180 through the analog switch 195.

If the controller 140 receives an interrupt signal generated from the interrupt generator 180 when the terminal in the power saving mode, the controller 140 releases the power saving mode. At this time, the controller 140 can release the power saving mode and convert the operational mode of the mobile terminal 100 into a speech recognition mode for performing speech recognition at the same time.

Further, if the controller 140 releases the power saving mode, it generates an alarm sound or vibration to indicate the release of the power saving mode and activates a backlight of the display 150. Further, the controller 140 may control specific characters (e.g., "Did you call me, sir?") or a picture to be displayed on the display 150 in accordance with user's option settings.

The display 150 may be composed of an LCD (Liquid Crystal Display) and the like, and outputs various kinds of display data generated in the mobile terminal. Further, the LCD may be is implemented to be used as a touch screen. Thereby, the display 150 may operate as an input.

The memory 160 may be configured as program and data memories, and stores various information selected on the basis of various information and user selection information required for operational control of the mobile terminal 100 according to the exemplary embodiment of the present invention. That is, the memory 160 is configured as a ROM for storing an operational algorithm accessed through the controller 140 for the purpose of a general operation of the mobile terminal 100 and a RAM for storing data in accordance with a control instruction in a process of data processing of the controller 140.

The audio processor 170 modulates an electric signal input from the microphone to convert it into speech data and demodulates encoded speech data input from the radio transmitter/receiver 110 as an electric signal to output it to a speaker. Further, the audio processor 170 is preferably provided with a codec for converting a digital audio signal received from the radio transmitter/receiver 110 into an analog signal to reproduce it or converting an analog audio signal generated from the microphone into a digital audio signal. The codec is configured as a data codec for processing packet data or the like and an audio codec for processing an audio signal such as speech. The codec may be included in the controller 140.

The interrupt generator 180 includes an Analog/Digital Converter (ADC) 181, a register 183 and a comparator 185.

In a case where a speech signal is output from the microphone path switching unit 190 when the mobile terminal 100 is in the power saving mode, the ADC 181 converts the speech signal into digital information that is output to the comparator 185.

The register 183 stores speech information for determining an occurrence of an interrupt signal activating the controller 140 in a deactivated state. That is, the speech information stored in the register 183 becomes a reference for the interrupt generator 180 to generate an interrupt signal. Consequently, the speech information becomes a signal for determining there should be a release from the power saving mode of the mobile terminal 100.

The comparator 185 compares information output from the ADC 181 with speech information stored in the register 183 and outputs an interrupt signal to the controller 140 if the information from each corresponds to each. That is, if the information output from the ADC 181 is "Wake up" in a case where the speech information stored in the register 183 is "Wake up," the information corresponds to each other so that the comparator 185 generates an interrupt signal to output it to the controller 140.

The microphone path switching unit 190 switches the output path of a speech signal from the microphone to the audio processor 170 or the interrupt generator 180 through a control signal output from the controller 140. To this end, the microphone path switching unit 190 preferably includes the analog switch 195 and the terminal operational mode checker 196. The terminal operational mode checker 196 can be implemented with a transistor or a pull-up resistor.

The analog switch 195 switches the output path of a speech signal to the audio processor 170 in a case where the operational mode of the mobile terminal 100 is not in the power saving mode, and switches the output path to the interrupt generator 180 in a case where the operational mode is in the power saving mode. The speech signal output to the audio processor 170 is transmitted to the controller 140.

If a control signal is input from the controller 140, the terminal operational mode checker 196 senses that the operational mode of the mobile terminal 100 has converted into the power saving mode, and transmits the input control signal to the analog switch 195.

Figure 4:
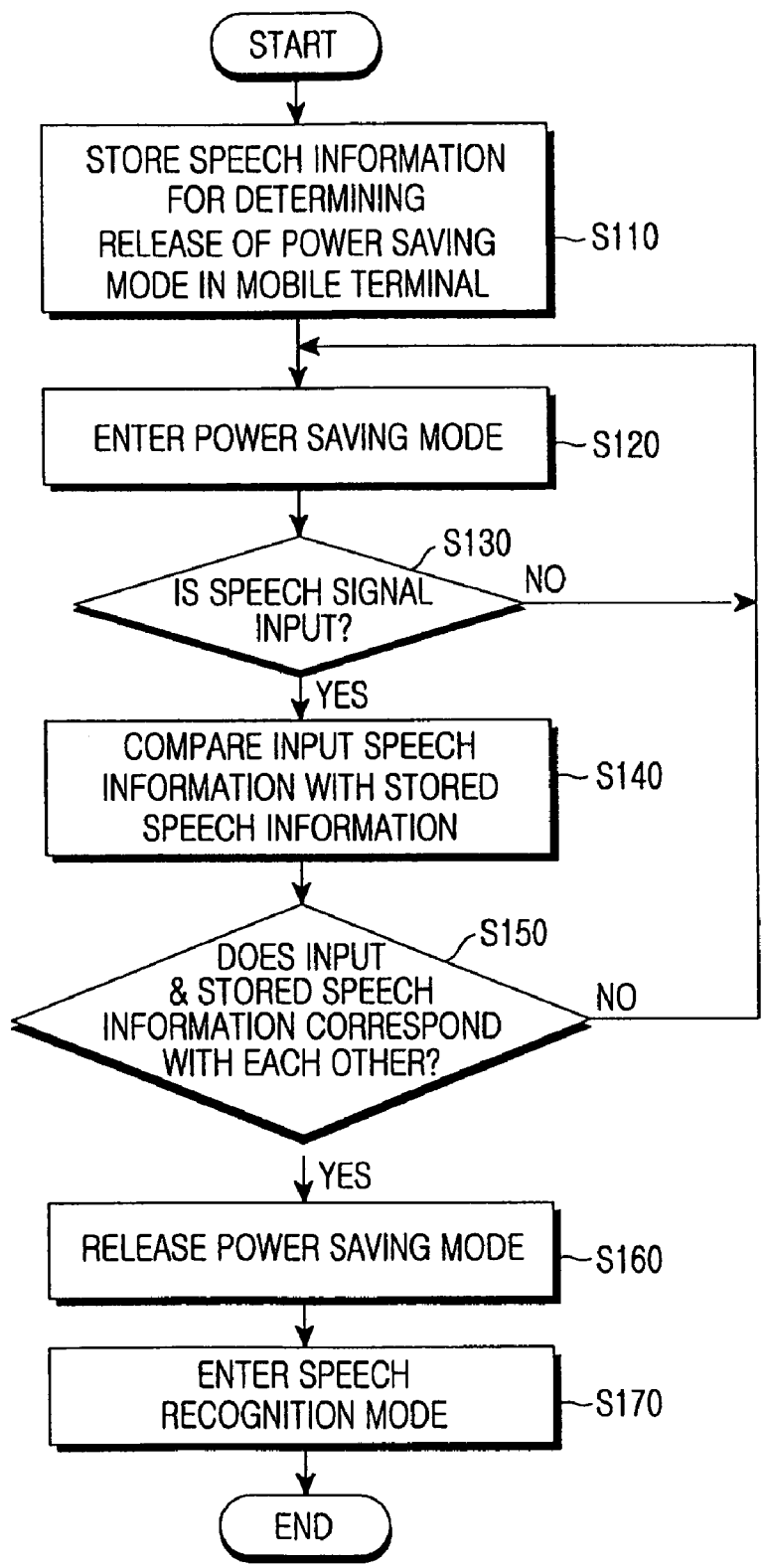
FIG. 4 is a flowchart illustrating an operational process of a mobile terminal according to an exemplary embodiment of the present invention.

FIG. 4 is a flowchart illustrating an operational process of a mobile terminal according to an exemplary embodiment of the present invention.

FIG. 4 will be described below with reference to FIGS. 1 to 3.

The controller 140 stores speech information for determining the release of the power saving mode of the mobile terminal 100 in the register 183 of the interrupt generator 180 (S110). That is, the speech information may become a user's speech or a specific sound and becomes a reference for the purpose of generating an interrupt signal by the interrupt generator 180.

If any event (e.g., inputting a key, transmitting/receiving a call, or the like) is not generated for a certain amount of time, the controller 140 converts the operational mode of the mobile terminal 100 into the power saving mode (S120). At this time, the controller 140 controls the output path of a speech signal input from the microphone to switch from the audio processor 170 to the interrupt generator 180, before being entering the power saving mode. That is, the terminal operational mode checker 196 of the microphone path switching unit 190 receives a control signal output from the controller 140 so as to control the analog switch 195 to switch the output path of the speech information input from the microphone to the interrupt generator 180. Thus, the speech signal input to the microphone path switching unit 190 through the microphone in the power saving mode is transmitted to the interrupt generator 180 by means of the analog switch 195.

The interrupt generator 180 identifies whether or not a speech signal is input through the microphone and microphone path switching unit 190 (S130).

If the speech signal is inputted, the interrupt generator 180 converts the transmitted speech signal into digital information through the ADC 181 and compares the converted information with speech information stored in the register 183 using the comparator 185 (S140).

The interrupt generator 180 identifies whether or not the inputted and stored speech information corresponds with each other (S150).

If the inputted and stored speech information corresponds with each other, the interrupt generator 180 generates an interrupt signal that is output to the controller 140. If the interrupt signal is received by the controller 140, the controller 140 is activated so as to release the power saving mode (S160).

The controller 140 releases the power saving mode and converts the operational mode of the mobile terminal 100 into a speech recognition mode for performing a speech recognition function (S170). At this time, if a user's speech dialing request is received in the speech recognition mode, the controller 140 may connect a call or send a short message using the telephone number requested by the user.

Further, after the power saving mode has been released, the controller 140 may control so as to generate an alarm sound or vibration indicating the release of the power saving mode or may activate a backlight of the display 150.

As described above, according to an exemplary embodiment of the present invention, since a mobile terminal releases a power saving mode and enters a speech recognition mode, if a specific speech or a sound is input while in the power saving mode, a user can telephone or send a short message despite the terminal being in the power saving mode.

Further, according to an exemplary embodiment of the present invention, a terminal in a power saving mode reacts to a specific speech or a sound to release the power saving mode and output an alarm so that a user can become aware of the location of the terminal if the user sends a specific signal despite not knowing the location of the terminal.

While certain exemplary embodiments of the invention has have been shown and described hereinwith reference to a certain preferred embodiments thereof, it will be understood by those skilled in the art that various changes in form and details may be made therein without departing from the spirit and scope of the invention as defined by the appended claims and their equivalents.

What is claimed is:

1. A mobile terminal comprising:
   a microphone path switching unit for switching a microphone signal path used to route audio information inputted from a microphone;
   an interrupt generator for storing audio information and for generating an interrupt signal if the audio information routed from the microphone path switching unit and the stored audio information substantially correspond with each other; and
   a controller for controlling the microphone path switching unit to switch the microphone signal path to a first signal path that routes audio information inputted from the microphone to the interrupt generator if the mobile terminal enters a power saving mode and for releasing the power saving mode and controlling the microphone path switching unit to switch the microphone signal path from the first signal path to a second signal path if the interrupt signal is generated while in the power saving mode.

2. The mobile terminal claimed in claim 1, wherein the interrupt signal is a signal for activating the controller while in the power saving mode.

3. The mobile terminal claimed in claim 1, further comprising an audio processor which the second signal path routes audio information inputted from the microphone to.

4. The mobile terminal claimed in claim 3, wherein the microphone path switching unit switches the microphone signal path to any one of the interrupt generator and the controller based on a control signal of the controller.

5. The mobile terminal claimed in claim 1, wherein the controller controls the microphone path switching unit to switch the microphone signal path to the first signal path by generating a control signal if the mobile terminal enters into the power saving mode.

6. The mobile terminal claimed in claim 1, wherein the interrupt generator comprises:
   a register for storing audio information;
   an analog/digital converter for converting the audio information from the microphone path switching unit into digital information; and
   a comparator for generating the interrupt signal if the converted digital information and the stored audio information substantially correspond with each other.

7. The mobile terminal claimed in claim 1, wherein the controller converts the audio information from the microphone into digital information to be stored in the interrupt generator.

8. The mobile terminal claimed in claim 1, wherein the controller controls the mobile terminal to be automatically converted into a speech recognition mode for performing a speech recognition function after the power saving mode is released.

9. The mobile terminal claimed in claim 1, wherein the controller controls a sound or vibration to be generated after the power saving mode is released.

10. The mobile terminal claimed in claim 1, further comprising a display in which a backlight is activated under a control of the controller if the power saving mode is released.

11. The mobile terminal claimed in claim 10, wherein the display displays a character or picture under a control of the controller if the power saving mode is released.

12. The mobile terminal claimed in claim 1, wherein at least one of the audio information from the microphone path switching unit and the stored audio information is any one of a user's speech and specific audio information.

13. A method of controlling an operational mode conversion using speech recognition in a mobile terminal, the mobile terminal routing audio information inputted from a microphone via a microphone signal path, the method comprising:

storing audio information;

switching the microphone signal path to a first signal path reserved for a power saving mode if the mobile terminal enters the power saving mode;

receiving audio information from the microphone and routing the received audio information via the reserved signal path if the operational mode of the mobile terminal is the power saving mode;

comparing the audio information routed from the first signal path with the stored audio information if the operational mode of the mobile terminal is the power saving mode; and switching the microphone signal path from the first signal path to a second signal path, and releasing the power saving mode if the audio information of the input audio information signal and the stored audio information substantially correspond with each other.

14. The method claimed in claim 13, wherein audio information of an input audio information signal is any one of a user's speech and specific audio information.

15. The method claimed in claim 13, further comprising converting the operational mode of the mobile terminal into a speech recognition mode for performing a speech recognition function after the power saving mode is released.

16. The method claimed in claim 15, further comprising connecting a call to a telephone number requested by a user in the speech recognition mode.

17. The method claimed in claim 15, further comprising sending a short message to a telephone number requested by a user in the speech recognition mode.

18. The method claimed in claim 13, further comprising generating a sound or vibration after the power saving mode is released.

19. The method claimed in claim 13, further comprising activating a backlight of a display in the mobile terminal after the power saving mode is released.

\* \* \* \* \*